United States Patent
Long et al.

(10) Patent No.: US 7,255,214 B2
(45) Date of Patent: Aug. 14, 2007

(54) DAMPER LOCK-OUT CLUTCH AND MOTOR/GENERATOR COOLING MULTIPLEXED CONTROL SYSTEM AND METHOD FOR AN ELECTRICALLY VARIABLE HYBRID TRANSMISSIONS

(75) Inventors: Charles F. Long, Pittsboro, IN (US); Michael D. Foster, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 302 days.

(21) Appl. No.: 11/110,368

(22) Filed: Apr. 20, 2005

(65) Prior Publication Data

US 2006/0240938 A1    Oct. 26, 2006

(51) Int. Cl.
*F16D 25/12*    (2006.01)

(52) U.S. Cl. ............... 192/85 R; 192/3.58; 192/113.5; 361/689

(58) Field of Classification Search ............... None
See application file for complete search history.

(56) References Cited

U.S. PATENT DOCUMENTS

| | | | | |
|---|---|---|---|---|
| 2006/0025264 A1* | 2/2006 | Sowul et al. | ............... | 475/5 |
| 2006/0240939 A1* | 10/2006 | Foster et al. | ............... | 477/3 |
| 2006/0246794 A1* | 11/2006 | Foster et al. | ............... | 440/86 |
| 2007/0049442 A1* | 3/2007 | Long et al. | ............... | 475/5 |

* cited by examiner

*Primary Examiner*—Saul Rodriguez

(57) ABSTRACT

The present invention provides a multiplexed control system, employing a single solenoid valve, to selectively control the damper lock-out clutch and motor/generator cooling of an electronically variable hybrid transmission. The present invention also contemplates a method of selectively controlling damper lock-out clutch engagement and motor/generator cooling for an electrically variable hybrid transmission control.

10 Claims, 5 Drawing Sheets

DAMPER LOCK-OUT CLUTCH AND MOTOR/GENERATOR COOLING MULTIPLEXED CONTROL SYSTEM AND METHOD FOR AN ELECTRICALLY VARIABLE HYBRID TRANSMISSIONS

TECHNICAL FIELD

The present invention relates to a multiplex control system for selectively controlling the damper lock-out clutch and motor/generator cooling of an electrically variable hybrid transmission.

BACKGROUND OF THE INVENTION

Automobile internal combustion engines produce torsional vibrations that are undesirable to transmit through the vehicle transmission. To isolate such torsional vibrations, torsional dampers may be implemented within the vehicle transmission. These dampers typically rest between the engine crankshaft and the input shaft of the transmission to substantially counteract the unwanted torsional vibrations generated by the engine. Dampers are typically configured with compliant members that have the capacity to carry maximum engine torque plus an additional margin. The damper system may employ a damper lock-out clutch to avoid the torsional resonance associated with the starting and stopping of the engine.

One premise behind hybrid automobiles is that alternative power is available to propel the vehicle, thus reliance on the engine for power can be decreased, thereby increasing fuel economy. Since hybrid vehicles can derive their power from sources other than the engine, hybrid vehicles may operate at low engine speeds and the engine may be shut down while the vehicle is propelled by the electric motors. For example, some electrically variable transmissions alternatively rely on two electric motor/generators housed within the transmission to effect movement of the vehicle. Engines in hybrid vehicles are therefore required to start and stop more often than engines in non-hybrid systems. Therefore, greater functionality is desirable in the damper system to allow the lock-out clutch to be actuated in various modes of operation such as engine shut down and start up, as well as while operating in purely electric mode.

Additionally, the stators for each electric motor/generator contained within the electrically variable hybrid transmission may each require differing rates of cooling that are dependent on the duty cycle of each motor/generator. The cooling of the stator is typically performed by bathing the stator with a calibrated flow rate of transmission fluid, thereby allowing the heat generated by operation of the motor/generators to be transferred to the fluid. A continuously high cooling rate is simple to implement, however, additional pump loads and spin losses may produce a decrease in efficiency over a selectively controllable motor/generator cooling system.

SUMMARY OF THE INVENTION

The present invention provides a multiplexed control system, employing a single solenoid valve, to selectively control the damper lock-out clutch system and the motor/generator cooling system of an electrically variable hybrid transmission. By multiplexing the two control systems, the systems can be controlled by one solenoid valve. This may provide a weight saving, a cost saving, and a reliability improvement. The present invention also provides a method of selectively controlling damper lock-out clutch engagement and motor/generator cooling for an electrically variable hybrid transmission.

Accordingly, the present invention provides a multiplexed system for controlling damper lock-out clutch engagement and motor/generator cooling for an electrically variable hybrid transmission having a selectively engageable damper lock-out clutch and a damper trim valve operable to effect engagement of the selectively engageable damper lock-out clutch. Also provided is at least one motor/generator cooling valve operable to provide a calibrated flow rate of fluid to cool at least one motor/generator and a selectively actuatable solenoid valve operable to selectively provide control pressure to the damper trim valve and the at least one motor/generator cooling valve. Additionally, a multiplex valve is operable to selectively direct control pressure to the damper trim valve and the at least one motor/generator cooling valve.

The selectively actuatable solenoid valve of the present invention may be a variable bleed solenoid valve or a pulse width modulated solenoid valve. The multiplexed system of the present invention may further include an auxiliary pressure source in fluid communication with the multiplex valve, and operable to selectively control the multiplex valve. The auxiliary pressure source may be an electrically controlled hydraulic pump. Additionally the damper trim valve of the present invention may be in fluid communication with a line pressure source, and may be operable to provide regulated line pressure to the damper lock-out clutch to effect engagement.

The present invention also provides a method of selectively controlling damper lock-out clutch engagement and motor/generator cooling for an electrically variable hybrid transmission having a multiplex valve, damper trim valve, and at least one motor/generator cooling valve. This is accomplished by selectively controlling the multiplex valve to selectively direct control pressure to the damper trim valve and the at least one motor/generator cooling valve.

The multiplex valve of the present invention may be controlled by auxiliary pressure, which may be provided by an electrically controlled hydraulic pump. The method of selectively controlling damper lock-out clutch engagement and motor/generator cooling for an electrically variable hybrid transmission may further include controlling the control pressure by a solenoid valve operable to regulate the control pressure. The solenoid valve may be a variable bleed solenoid valve or a pulse width modulated solenoid valve. Additionally, the method of the present invention may include controlling the damper trim valve to regulate fluid pressure values directed to a damper lock-out clutch.

The present invention also provides a multiplexed system for controlling damper lock-out clutch engagement and motor/generator cooling for an electrically variable hybrid transmission having a control pressure source of fluid and a selectively engageable damper lock-out clutch. The present invention further includes a damper trim valve with a spring set position and a trim position, wherein the damper trim valve is operable to effect engagement of the damper lock-out clutch when the damper trim valve is in the trim position. The damper trim valve is also operable to disengage the damper lock-out clutch when the damper trim valve is in the spring set position. At least one motor/generator cooling valve is provided, and is operable to selectively provide variable rates of fluid flow to effect cooling of at least one motor/generator. Additionally, a multiplex valve is provided that has a first position enabling communication of the fluid to the damper trim valve but not the at least one motor/ generator cooling valve, and a second position enabling communication of the -fluid to the at least one motor/generator cooling valve but not the damper trim valve.

The first position and second position of the multiplex valve may be controlled by an auxiliary pressure source. The auxiliary pressure source of the present invention may be an electrically controlled hydraulic pump. Additionally, a solenoid valve may regulate the pressure of the fluid from the control pressure source.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
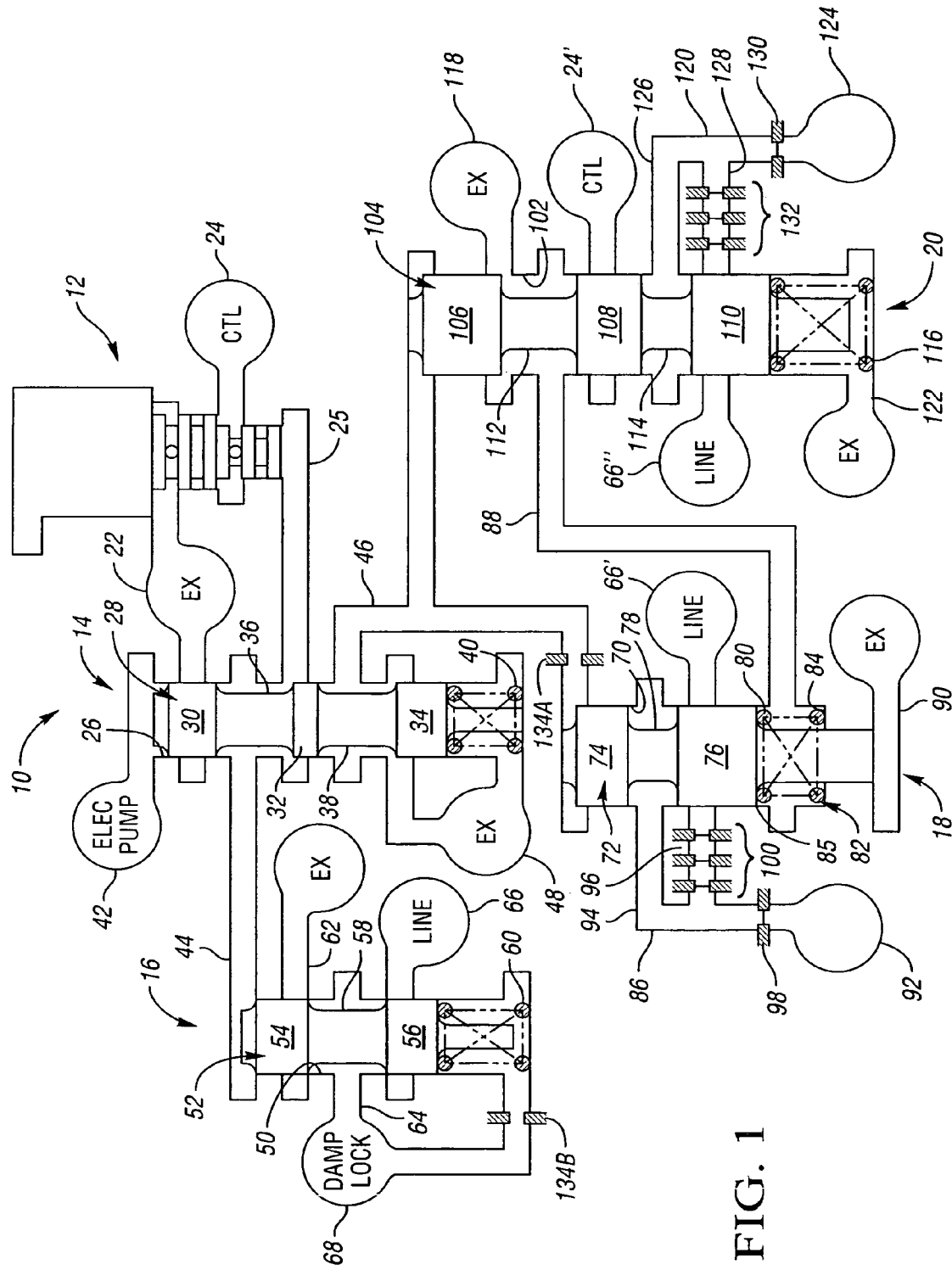
FIG. 1 is an exemplary schematic diagram of a multiplexed control system of this invention for selectively controlling a damper lock-out clutch system and a motor/generator cooling system of an electrically variable hybrid transmission illustrating the engine off operating condition.

Referring to the drawings, wherein like characters represent the same or corresponding parts throughout the several views, there is seen in FIGS. 1 through 5 a multiplexed control system 10 having a solenoid valve 12, a multiplex valve 14, a damper trim valve 16, a motor/generator A cooling valve 18, and a motor/generator B cooling valve 20. The solenoid valve 12 is a variable pressure-type solenoid valve that may include a variable bleed or a pulse width modulated solenoid valve. Those skilled in the art of control systems will appreciate that there may be other types of solenoid valves compatible with the multiplexed control system 10 of the present invention. The solenoid valve 12 is a normally low type in that the solenoid valve 12 will not allow the passage of pressurized fluid if electrical power to the solenoid valve 12 is discontinued. However, a normally high type may be used depending on the application and the desired default state of the multiplexed control system 10 upon electrical power interruption.

The solenoid valve 12 is in fluid communication with an exhaust passage 22, a control pressure source 24, and a control passage 25. The exhaust passage 22 ensures that pressurized fluid is evacuated from within the solenoid valve 12 upon deactuation of the solenoid valve 12. The control pressure source 24 provides a pressurized fluid signal to allow the control passage 25 to be selectively pressurized at varying pressure levels by the actuation of the solenoid valve 12.

The multiplex valve 14 has a bore 26 and a valve spool 28 slidably disposed therein. The valve spool 28 has lands 30, 32, and 34. Additionally, a valley 36 is situated between lands 30 and 32, while a valley 38 is situated between lands 32 and 34. The valve spool 28 is biased within bore 26 by a spring 40. The multiplex valve 14 is in fluid communication with an auxiliary pressure source 42, the exhaust passage 22, a damper trim valve control passage 44, the control passage 25, a motor/generator control passage 46, and an exhaust passage 48. The valve spool 28 operates to selectively open and block each of these passages depending on the position of the valve spool 28 within the bore 26.

The damper trim valve 16 has a bore 50 and a valve spool 52 slidably disposed therein. The valve spool 52 has lands 54 and 56, with a valley 58 situated therebetween. The valve spool 52 is biased within bore 50 by a spring 60. The damper trim valve 16 is in fluid communication with the damper trim valve control passage 44, an exhaust passage 62, a damper lock-out clutch feed passage 64, and a line pressure source 66. The valve spool 52 operates to selectively open and block each of these passages depending on the position of the valve spool 52 within the bore 50. The damper lock-out clutch feed passage 64 is the conduit through which pressurized fluid will selectively flow to effect engagement of a damper lock-out clutch 68.

The motor/generator A cooling valve 18 has a bore 70 and a valve spool 72 slidably disposed therein. The valve spool 72 has lands 74 and 76, with a valley 78 situated therebetween. The valve spool 72 is biased within bore 70 by a spring 80. The spring 80 is contained within a spring chamber 82 formed by the land 76, the bore 70, and an end wall 84. The land 76 has a differential area 85 which is operable to provide a desired pressure differential between opposite ends of the valve spool 72. The motor/generator A cooling valve 18 is in fluid communication with the motor/generator control passage 46, a motor/generator A cooling feed passage 86, a line pressure source 66', a differential pressure passage 88, and an exhaust passage 90. The valve spool 72 operates to selectively open or block each of these passages depending on the position of the valve spool 72 within the bore 70.

The motor/generator A cooling feed passage 86 is the conduit through which pressurized fluid may flow to effect cooling of motor/generator A 92. The amount of cooling flow available to motor/generator A 92 is determined by the amount of pressure provided by the line pressure source 66' as well as through which branch, 94 or 96, of the motor/generator A cooling feed passage 86 the fluid is allowed to flow. The branch 94 has a single orifice 98, which will cause a minor restriction in flow when compared to the multiple orifice set 100 of branch 96. The selection of branch 94 or 96 will ultimately depend on the position of the valve spool 72 within the bore 70.

The motor/generator B cooling valve 20 has a bore 102 and a valve spool 104 slidably disposed therein. The valve spool 104 has lands 106, 108 and 110. Additionally, a valley 112 is situated between the lands 106 and 108, while a valley 114 is situated between the lands 108 and 110. The valve spool 104 is biased within bore 102 by a spring 116. The motor/generator B cooling valve 20 is in fluid communication with the motor/generator control passage 46, an exhaust passage 118, the differential passage 88, a control pressure source 24', a motor/generator B cooling feed passage 120, a line pressure source 66", and an exhaust passage 122. The valve spool 104 operates to selectively open or block each of these passages depending on the position of the valve spool 104 within the bore 102.

The motor/generator B cooling feed passage 120 is the conduit through which pressurized fluid may flow to effect cooling of motor/generator B 124. The amount of cooling flow available to the motor/generator B 124 is determined by the amount of pressure provided by the line pressure source 66" as well as through which branch, 126 or 128, of the motor/generator B cooling feed passage 120 the fluid is allowed to flow. The branch 126 has a single orifice 130, which will cause a relatively minor restriction in fluid flow when compared to the multiple orifice set 132 of branch 128. The selection of branch 126 or 128 will ultimately depend on the position of the valve spool 104 within the bore 102.

The line pressure sources 66, 66', and 66" are typically maintained at the same pressure, however they need not be. Likewise, the control pressure sources 24 and 24' are typically maintained at the same pressure level however they need not be. Additionally, orifices 134A and 134B may be provided as additional fluid flow control measures.

Electric Mode—Engine Off

In FIG. 1 there is seen an exemplary schematic diagram of the multiplexed control system 10 for selectively controlling the damper lock-out clutch 68 and the cooling of motor/generator A 92 and motor/generator B 124, illustrating the engine off operating condition. Hybrid electric vehicles may selectively energize motors by battery power to effect movement of the hybrid electric vehicle. This engine off mode is sometimes referred to as "Electric Mode". During this state of operation, an auxiliary pressure source 42, such as an electrically controlled hydraulic pump, is employed to maintain fluid pressure within the electrically variable hybrid transmission. Since operation in the "Electric Mode" is limited, and torque requirements on the motor/generators are low and brief in duration, a large amount of cooling is not required by the motor/generator A 92 and the-motor/generator B 124.

The damper lock-out clutch 68 should be engaged when stopping and starting the internal combustion engine, which occurs when transitioning into and out of "Electric Mode". This clutching is required to avoid the torsional vibrations associated with an engine moving into and out of its torsional resonant point. As the vehicle enters an operating mode in which the internal combustion engine may be stopped, the auxiliary pressure source 42 is activated by the vehicle control system (not shown). This pressurized fluid from the auxiliary pressure source 42 forces the valve spool 28 of the multiplex valve 14 into a pressure set position. The valley 36 will allow fluid communication between the control passage 25 and the damper trim valve control passage 44.

The solenoid valve 12 may now precisely control the fluid pressure within the damper trim valve control passage 44 by allowing regulated fluid from the control pressure source 24 into the control passage 25. As the solenoid valve 12 permits the increase of the pressure within the damper trim valve control passage 44, the valve spool 52 of the damper trim valve 16 will move from its spring set position, as shown in FIGS. 2 through 5, to bias against the spring 60. The valve spool 52 will move into a trim position, as shown in FIG. 1, when the fluid pressure operating on land 54 overcomes the force of spring 60. At which point, the damper lock-out clutch 68 will stop exhausting fluid pressure through the damper lock-out clutch feed passage 64 into the exhaust passage 62 via the valley 58. Instead, the land 54 will block the exhaust passage 62 and the land 56 will permit pressurized fluid from the line pressure source 66 to enter the damper lock-out clutch feed passage 64 via-valley 58. The increased fluid pressure within the damper lock-out clutch feed passage 64 will enable engagement of the damper lock-out clutch 68.

Concurrently, the position of the valve spool 28 within the multiplex valve 14 will cause any fluid pressure within the motor/generator control passage 46 to be exhausted by the exhaust passage 48 via valley 38. This will ensure that both the valve spool 72 of the motor/generator A cooling valve 18 and the valve spool 104 of the motor/generator B cooling valve 20 will remain in the spring set position thereby providing a minimal amount of cooling fluid to motor/generator A 92 and motor/generator B 124 via branch 96 and 128 respectively.

Engine On—Low Cooling Flow to Motor/generator A and Motor/generator B

Figure 2:
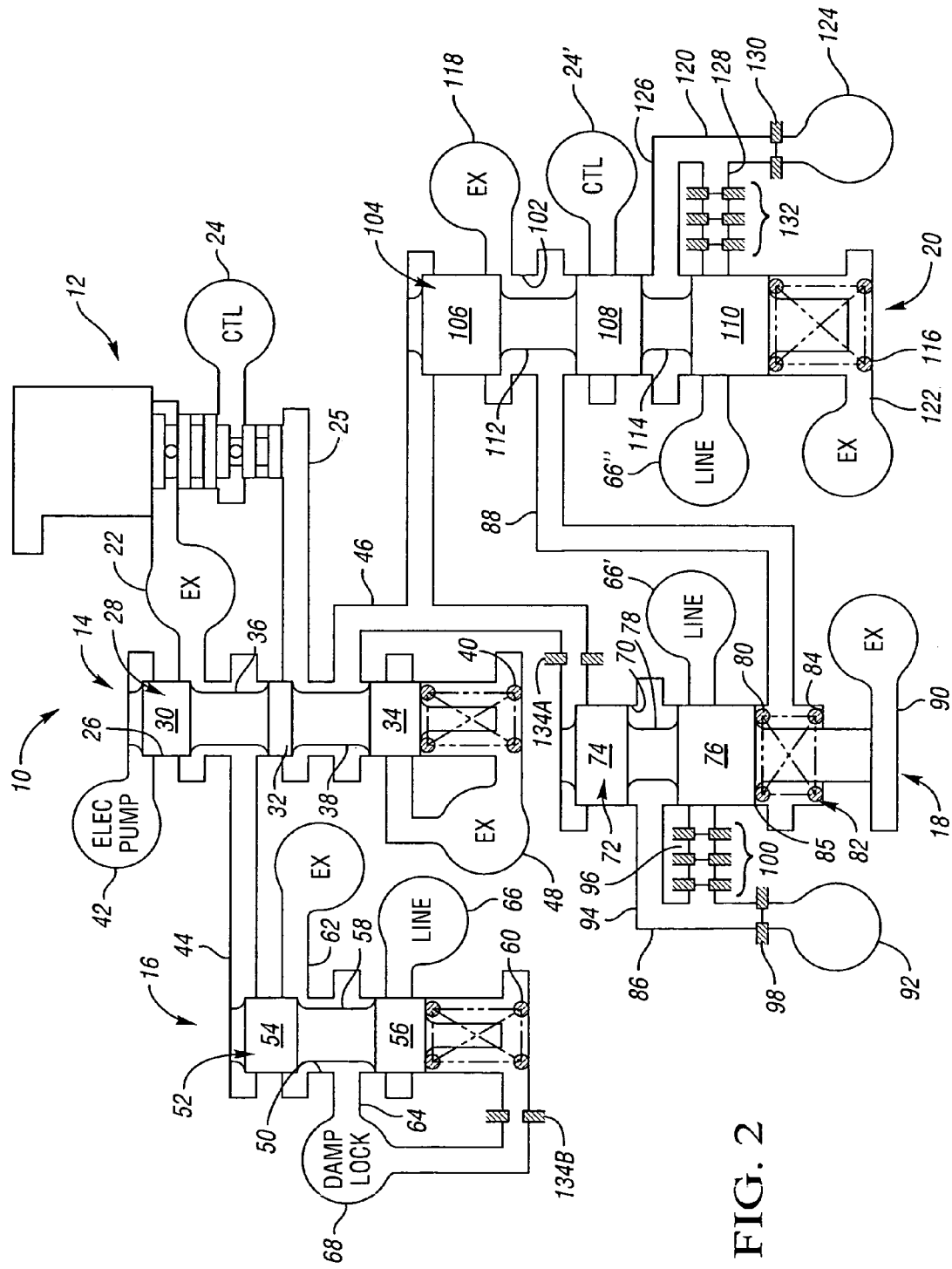
FIG. 2 is an exemplary schematic diagram of the multiplexed control system of this invention for selectively controlling the damper lock-out clutch system and the motor/generator cooling system of an electrically variable hybrid transmission illustrating the engine on, low cooling flow to both motor/generator A and motor/generator B operating condition.

FIG. 2 is an exemplary schematic diagram of the multiplexed control system 10 for selectively controlling the damper lockout clutch engagement and motor/generator cooling, illustrating the engine on, low cooling flow to both the motor/generator A 92 and the motor/generator B 124 operating condition. The auxiliary pressure source 42 is turned off following engine restart thereby relieving the fluid pressure acting upon the valve spool 28 of the multiplex valve 14. The spring 40 will bias the valve spool 28 into a spring set position. The damper trim valve control passage 44 will then exhaust though the exhaust passage 22 by way of valley 36. The lack of fluid pressure acting on land 54 will allow the spring 60 to bias the valve spool 52 of the damper trim valve 16 into a spring set condition. As a result, the land 56 will move into position to block the line pressure source 66 and allow the disengagement of the damper lock-out clutch 68 by exhausting fluid pressure through the damper lock-out clutch feed passage 64 into the exhaust passage 62 via valley 58. This condition will remain for the duration of the engine on conditions.

At low pressure values within the control passage 25, both the valve spool 72 within the motor/generator A cooling valve 18 and the valve spool 104 within the motor/generator B cooling valve 20 will remain in the spring set position. In this state, the land 76 of the valve spool 72 will block the pressurized fluid of the line pressure source 66' from entering branch 94 of the motor/generator A feed passage 86. Instead, the pressurized fluid from the line pressure source 66' will be directed into branch 96 where it must traverse a multiple orifice set 100 prior to entering the motor/generator A feed passage 86 and ultimately to effect cooling of motor/generator A.

Likewise, the land 110 of the valve spool 104 will block the pressurized fluid of the line pressure source 66" from entering branch 126 of the motor/generator B feed passage 120. Instead, the pressurized fluid from the line pressure source 66" will be directed into branch 128 where it must traverse a multiple orifice set 132 prior to entering the motor/generator B feed passage 120 and ultimately to effect cooling of motor/generator B 124. Additionally, with the valve spool 104 in the spring set position, the land 108 will block fluid flow from the control pressure source 24' to the differential passage 88.

The high flow restriction of the multiple orifice sets 100 and 132 produce a low fluid flow rate condition within the motor/generator A feed passage 86 and the motor/generator B feed passage 120, respectively. Those skilled in the art will recognize that the flow rate may be tailored to the specific application by adjusting the amount of restriction within branches 96 and 128 and/or adjusting the pressure value of the line pressure sources 66' and 66".

Figure 3:
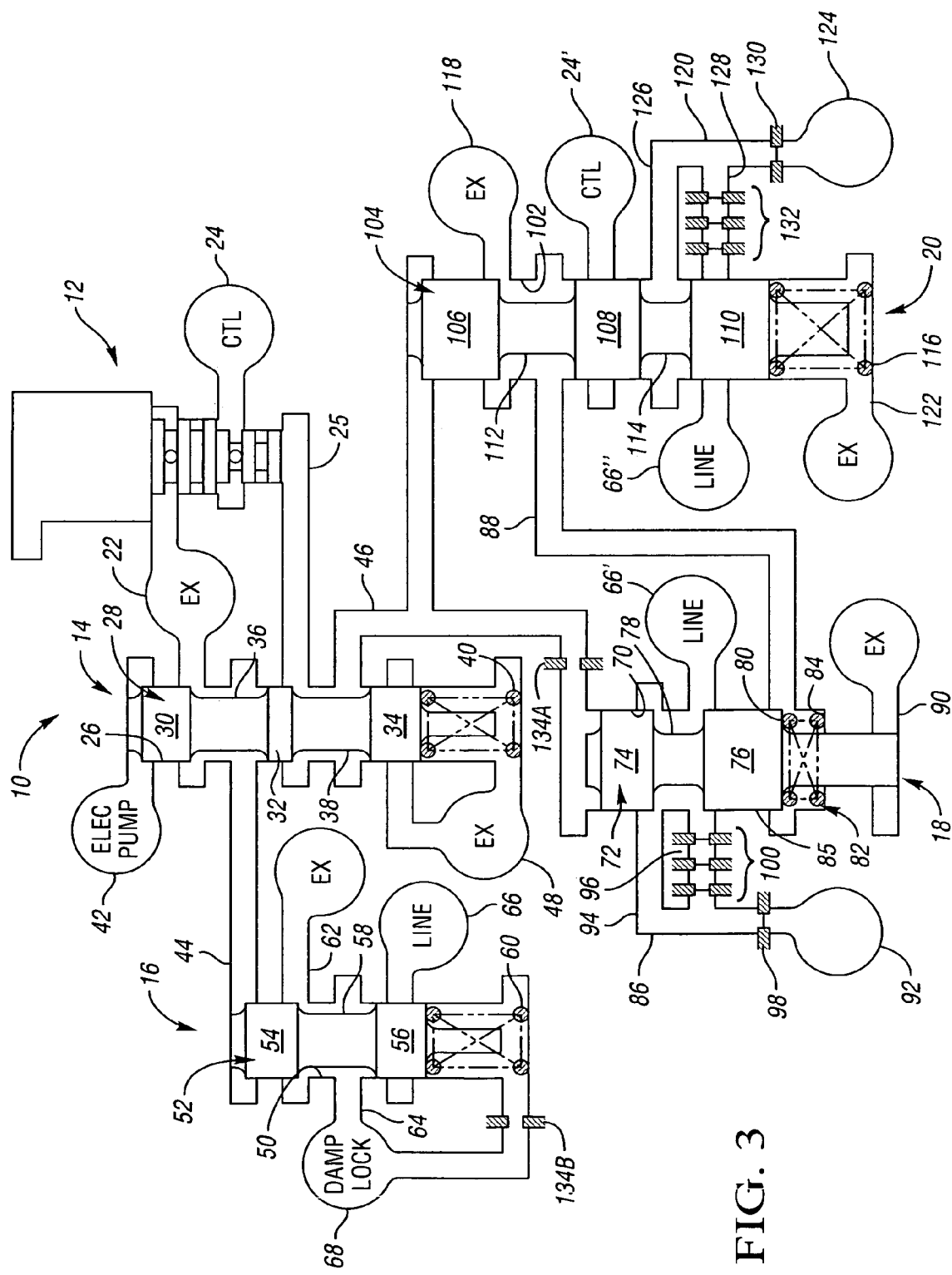
FIG. 3 is an exemplary schematic diagram of the multiplexed control system of this invention for selectively controlling the damper lock-out clutch system and the motor/generator cooling system of an electrically variable hybrid transmission illustrating the engine on, high cooling flow to motor/generator A and low cooling flow to motor/generator B operating condition.

Engine On—Low Cooling Flow to Motor/generator B and High Cooling Flow to Motor/generator A FIG. 3 is an exemplary schematic diagram of the multiplexed control system 10 for selectively controlling the damper lockout clutch engagement and motor/generator cooling, illustrating the engine on, high cooling flow to the motor/generator A 92 and low cooling flow to the motor/generator B 124 operating condition. As the solenoid valve 12 actuates to allow greater fluid communication between the control passage 25 and the control pressure source 24, the fluid pressure will increase within both the control passage 25 and the motor/generator control passage 46. The increased pressure within the motor/generator control passage 46 will bias the valve spool 72 of the motor/generator A cooling valve 18 into a pressure set position against the spring 80. The position of the valve spool 72 within the bore 70 will allow pressurized fluid from the line pressure source 66' to flow into both branches 94 and 96, of the motor/generator A feed passage 86, via valley 78. Motor/generator A 92 will now receive fluid though the single orifice 98 at a much higher flow rate than when the valve spool 72 is in the spring set position.

The spring 116 of the motor/generator B cooling valve 20 is of sufficient stiffness to bias the valve spool 104 in the spring set position, thereby ensuring that the fluid flow to the motor/generator B 124 will remain at a low level. The line pressure source 66" will continue to provide pressurized fluid to the motor/generator B feed passage 120 via the branch 128. The high flow restriction of the multiple orifice set 132 will produce a low fluid flow rate condition within the motor/generator B feed passage 120.

Figure 4:
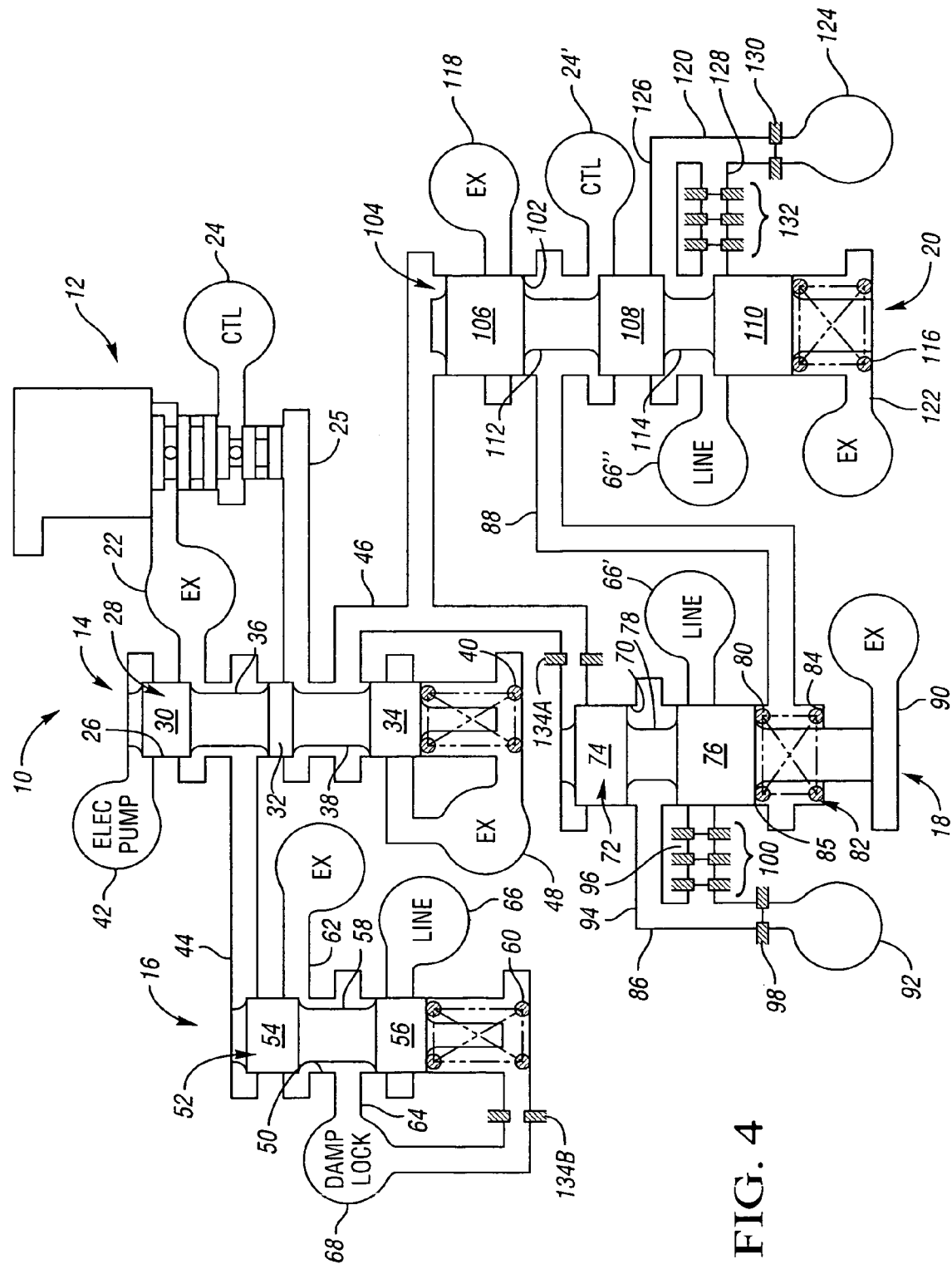
FIG. 4 is an exemplary schematic diagram of the multiplexed control system of this invention for selectively controlling the damper lock-out clutch system and the motor/generator cooling system of an electrically variable hybrid transmission illustrating the engine on, low cooling flow to motor/generator A and high cooling flow to motor/generator B operating condition.

Engine On—Low Cooling Flow to Motor/generator A and High Cooling Flow to Motor/generator B FIG. 4 is an exemplary schematic diagram of the multiplexed control system 10 for selectively controlling the damper lockout clutch engagement and motor/generator cooling, illustrating the engine on, low cooling flow to the motor/generator A 92 and high cooling flow to the motor/generator B 124 operating condition. As the solenoid valve 12 actuates to allow even greater fluid communication between the control passage 25 and the control pressure source 24, the fluid pressure will further increase in both the control passage 25 and the motor/generator control passage 46. As a result, the fluid pressure within the motor/generator control passage 46 will bias the valve spool 104 of the motor/generator B cooling valve 20 into a pressure set position. The position of the valve spool 104 within the bore 102 will allow pressurized fluid from the line pressure source 66" to flow into both branch 126 and 128, of the motor/generator B feed passage 120, via valley 114. Motor/generator B 124 will now receive fluid though a single orifice 130 at a much higher flow rate than when the valve spool 104 is in the spring set position.

By moving valve spool 104 into the pressure set position, the valley 112 will allow the control pressure source 24' to pressurize the differential pressure passage 88. The differential pressure passage 88 will in turn pressurize the spring chamber 82, and act upon the differential area 85 of land 76 to bias the valve spool 72 of the motor/generator A cooling valve 18 into the spring set position. In this position, the land 76 of the valve spool 72 will block the pressurized fluid of the line pressure source 66' from entering branch 94 of the motor/generator A feed passage 86. Instead, the pressurized fluid from the line pressure source 66' will be directed into branch 96 where it must traverse the multiple orifice set 100 prior to entering the motor/generator A feed passage 86 and to ultimately effect the cooling of motor/generator A 92. The high restriction of the multiple orifice set 100 will produce a low fluid flow rate condition within the motor/generator A feed passage 86.

Figure 5:
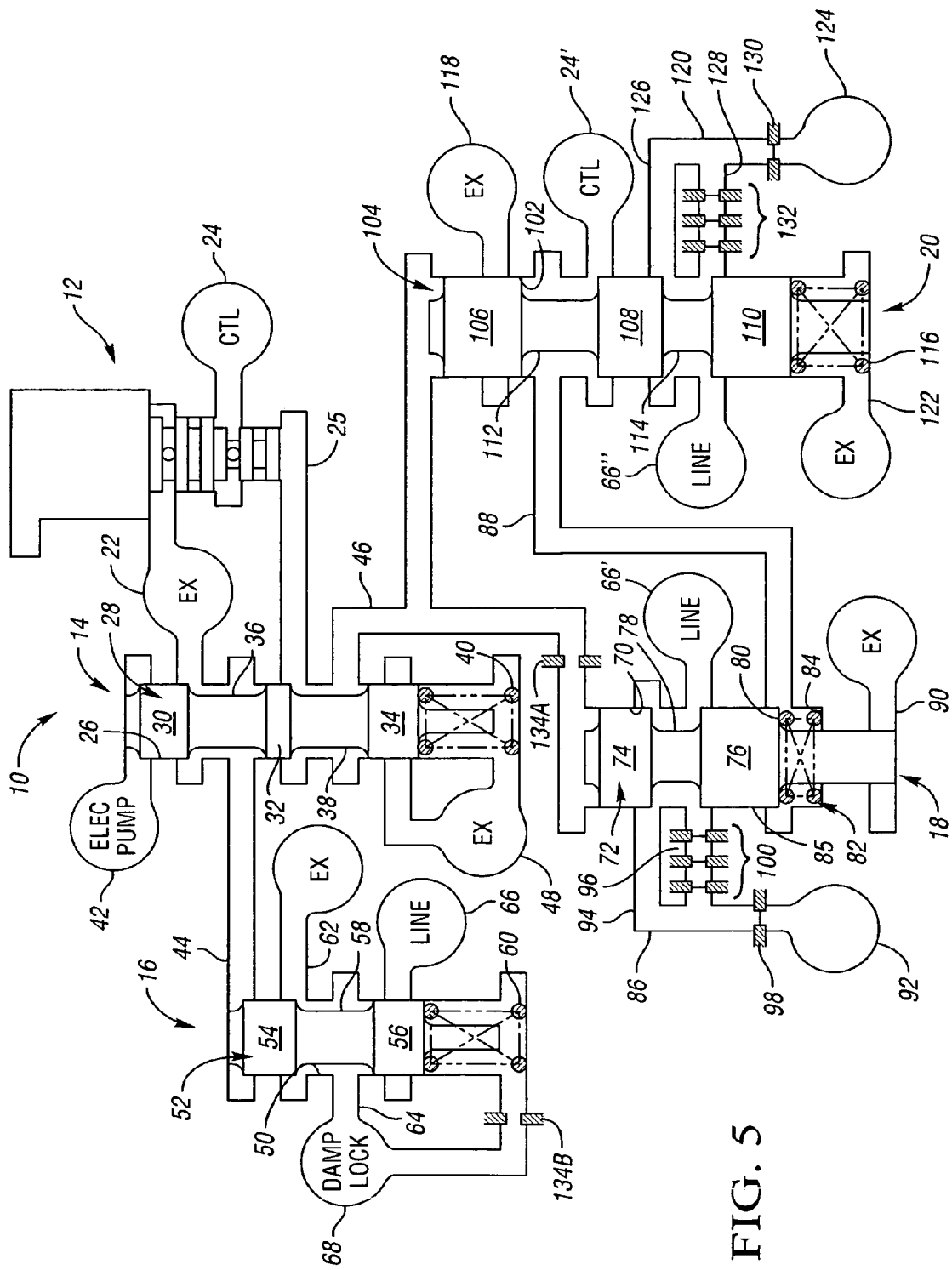
FIG. 5 is an exemplary schematic diagram of the multiplexed control system of this invention for selectively controlling the damper lock-out clutch system and the motor/generator cooling system of an electrically variable hybrid transmission illustrating the engine on, high cooling flow to motor/generator A and high cooling flow to motor/generator B operating condition.

Engine On—High Cooling Flow to Motor/generator A and High Cooling Flow to Motor/generator B FIG. 5 is an exemplary schematic diagram of the multiplexed control system 10 for selectively controlling the damper lockout clutch engagement and motor/generator cooling, illustrating the engine on, high cooling flow to the motor/generator A 92 and high cooling flow to the motor/generator B 124 operating condition. As the solenoid valve 12 actuates to allow even greater fluid communication between the control passage 25 and the control pressure source 24, the fluid pressure will further increase within both the control passage 25 and the motor/generator control passage 46. As a result, the motor/generator control passage 46 will bias the valve spool 104 of the motor/generator B cooling valve 20 into a pressure set position. The position of the valve spool 104 within the bore 102 will allow pressurized fluid from the line pressure source 66" into both branches 126 and 128 via valley 114. Motor/generator B 124 will now receive fluid though a single orifice 130 at a much higher flow rate than when the valve spool 104 is in the spring set position.

Additionally, the increased pressure within the motor/generator control passage 46 is now of a sufficient magnitude to bias the valve spool 72 contained within the motor/generator A cooling valve 18 into the pressure set position by overcoming both the spring force of spring 80 and the force acting upon the differential area 85 of land 76. The position of the valve spool 72 within the bore 70 will introduce pressurized fluid from the line pressure source 66' into both branch 94 and 96 via valley 78. Motor/generator A 92 will now receive fluid though a single orifice 98 at a much higher flow rate than when the valve spool 72 is in the spring set position.

By providing four modes of motor/generator cooling, multiple electric motor/generator assemblies may be independently cooled at varying rates depending on the duty cycle of each motor/generator. Increases in efficiency may be achieved though reduced pump loads and spin losses by selectively controlling the fluid flow to effect the cooling of each motor/generator. Additionally, by multiplexing a single solenoid valve, to selectively control the damper lock-out clutch system and the motor/generator cooling system of an electrically variable hybrid transmission, a weight saving, a cost saving, and a reliability improvement may be achieved.

While the best modes for carrying out the invention have been described in detail, those familiar with the art to which this invention relates will recognize various alternative designs and embodiments for practicing the invention within the scope of the appended claims.

The invention claimed is:

1. A system for controlling damper lock-out clutch engagement and motor/generator cooling for an electrically variable hybrid transmission comprising:
   a selectively engageable damper lock-out clutch;
   a damper trim valve operable to effect engagement of said selectively engageable damper lock-out clutch;
   at least one motor/generator cooling valve operable to provide a calibrated flow rate of fluid to cool at least one motor/generator;
   a selectively actuatable solenoid valve operable to selectively provide control pressure to said damper trim valve and said at least one motor/generator cooling valve; and
   a multiplex valve operable to selectively direct control pressure to said damper trim valve and said at least one motor/generator cooling valve.

2. The system of claim 1, wherein said selectively actuatable solenoid valve is a variable bleed solenoid valve.

3. The system of claim 1, wherein said selectively actuatable solenoid valve is a pulse width modulation solenoid valve.

4. The system of claim 1, further comprising an auxiliary pressure source in fluid communication with said multiplex valve, and operable to selectively control said multiplex valve.

5. The system of claim 4, wherein said auxiliary pressure source is an electrically controlled hydraulic pump.

6. The system of claim 1, wherein said damper trim valve is in fluid communication with a line pressure source, said trim valve being operable to provided regulated line pressure to said damper lock-out clutch to effect said engagement.

7. A system for controlling damper lock-out clutch engagement and motor/generator cooling for an electrically variable hybrid transmission comprising:
   a control pressure source of fluid;
   a selectively engageable damper lock-out clutch;
   a damper trim valve with a spring set position and a trim position, wherein said damper trim valve is operable to effect engagement of said damper lock-out clutch when said damper trim valve is in said trim position, and to disengage said damper lock-out clutch when said damper trim valve is in said spring set position;
   at least one motor/generator cooling valve operable to selectively provide variable rates of fluid flow to effect cooling of at least one motor/generator; and
   a multiplex valve having a first position enabling communication of said fluid to said damper trim valve but not said at least one motor/generator cooling valve, and a second position enabling communication of said fluid to said at least one motor/generator cooling valve but not said damper trim valve.

8. The system for controlling damper lock-out clutch engagement and motor/generator cooling of claim 7, wherein said first position and second position of said multiplex valve is controlled by an auxiliary pressure source.

9. The system for controlling damper lock-out clutch engagement and motor/generator cooling of claim 8, wherein said auxiliary pressure source is an electrically controlled hydraulic pump.

10. The system for controlling damper lock-out clutch engagement and motor/generator cooling of claim 7, wherein the pressure of said fluid from said control pressure source is regulated by a solenoid valve.

* * * * *